Figure 1:
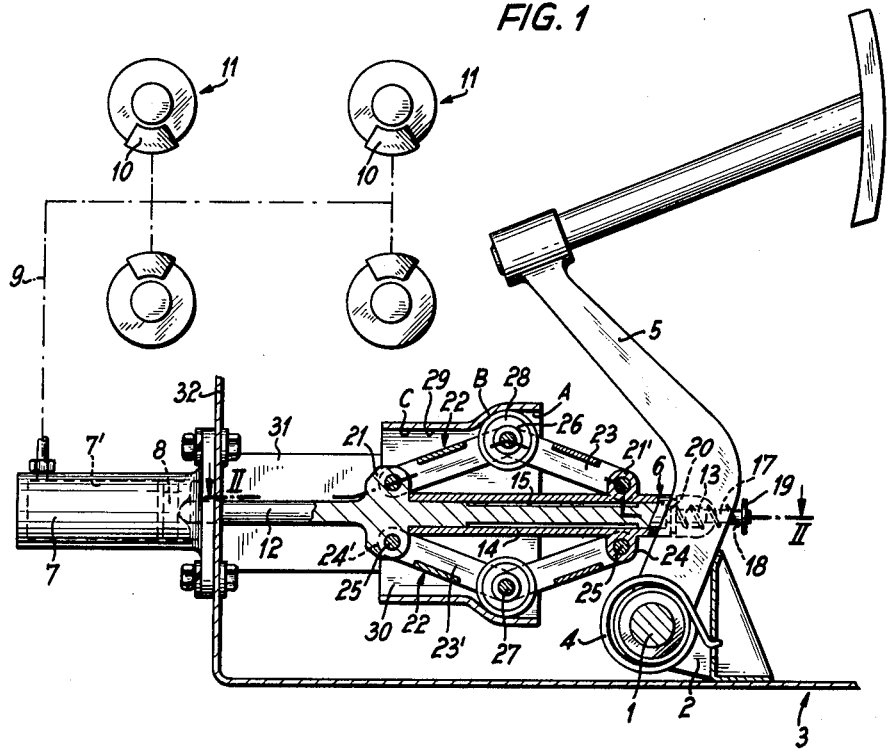

INVENTOR:
Erich STOTZ
BY Dicke + Craig
ATTORNEYS 3,200,597
BRAKE SYSTEM
Erich Stotz, Rommelshausen, Konstrukteur, Germany, assignor to Firma Dr. Ing. h.c. F. Porsche K.G., Stuttgart-Zuffenhausen, Germany
Filed Oct. 15, 1964, Ser. No. 404,008
Claims priority, application Germany, Oct. 29, 1963,
P 32,870
5 Claims. (Cl. 60—54.6)

The present invention relates to an actuating mechanism with variable transmission ratio for hydraulically actuated, partial disk brakes of vehicle in which the friction linings are held with a venting play with respect to the brake disk.

It is already known in the prior art to reduce in actuating installations of brake systems for vehicles the lost motions in the transmission elements of mechanically actuated drum brakes by changing the transmission ratio. These installations, however, are complicated and are not suitable for installation into a hydraulically actuated disk brake system in which, by reason of its approximate lack of any operating characteristics, lost motion paths have to be avoided at any rate. By the unavoidable summation of different assembly tolerances and the deformation of the suspension parts of the wheel brakes, this condition cannot be realized, whence one necessitated with the known prior art constructions hydraulic servo-amplifiers or stepped cylinders which are correspondingly costly and expensive.

The aim of the present invention, in contradistinction thereto, essentially consists in avoiding servo-auxiliary apparatus and to create, for purposes of changing the transmission ratio, as simple as possible a mechanical actuating mechanism which is particularly suited for the installation into disk brake systems. This is achieved in accordance with the present invention in that the actuating mechanism arranged between the brake pedal and the master cylinder includes knee-joint-like levers, which guided along curved tracks, effect at least over a part of the actuating path thereof an increase in the piston stroke of the master brake cylinder. As a result thereof, with a constant pedal path the venting play between the friction linings and the brake disk may be kept larger from the start which permits larger permissive tolerances and therewith an inexpensive manufacture and assembly of the brake system. By reason of the larger tolerances, stronger deformations of the brake disks are also absorbed. The disk can thereby be constructed of lighter weight which has a particularly advantageous effect on the weight per horsepower of the vehicle. Additionally, with such types of constructions, no output loss and no disagreeable dragging or rubbing noises can occur by reason of abutment of the friction linings at the brake disk.

The knee-joint-like levers consist each of two manually coordinated jointed rods which are pivotally connected with one end thereof at one or the other part of a two-partite piston rod of the master brake cylinder and at the other end thereof are pivotally connected with each other. Rollers are operatively associated or coordinated to the connecting joints of the knee-joint-like levers which roll off along the curved track during actuation of the brake. Furthermore, spring elements are provided on the piston rod which assure a continuous abutment of the rollers at the curved track. The curved track is constituted by a sleeve either completely or partly surrounding the knee-joint-like linkage which is elastically secured at a fixed part of the vehicle body by the interposition of springs or the like.

Accordingly, it is an object of the present invention to provide an actuating mechanism for disk brakes which, by simple and operationally reliable means, avoids the shortcomings and drawbacks encountered with the prior art constructions.

It is another object of the present invention to provide an actuating mechanism for disk brakes which is simple in construction and is particularly suitable for installation into hydraulically actuated partial disk brake systems.

A further object of the present invention resides in the provision of an actuating mechanism for disk brakes which obviates the need for servo-mechanisms and/or complicated stepped piston assemblies.

Still another object of the present invention resides in the provision of a disk brake actuating mechanism which permits the attainment of a change in the transmission ratio by the most simple means, easy to install, and permitting relatively large tolerances in the assembly of the mechanism.

Still a further object of the present invention resides in the provision of an actuating mechanism for disk brakes which not only permits larger tolerances in the various parts thereof, therewith entailing a reduction in the costs of manufacture and assembly, but also readily absorbs strong deformations of the brake disks so that the brake disk can be of lighter weight in the actual realization thereof.

Another object of the present invention resides in the provision of an actuating mechanism for a disk brake of motor vehicles, which permits an increase in the horsepower per unit weight of the vehicle.

A further object of the present invention resides in the provision of an actuating mechanism for disk brakes which prevents noises due to undesirable abutment of friction linings at the brake disks while the brakes remain non-actuated.

Figure 2:
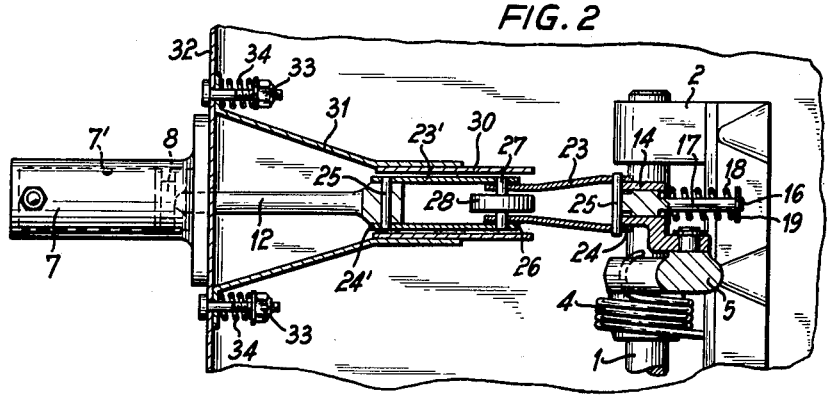

These and further objects, features and advantages of the present invention will become more obvious from the following description when taken in connection with the accompanying drawing which shows, for purposes of illustration only, one embodiment in accordance with the present invention, and wherein FIGURE 1 is a longitudinal cross sectional view through an actuating mechanism in accordance with the present invention, illustrating also schematically the remainder of the brake system, and FIGURE 2 is a cross sectional view taken along line II—II of FIGURE 1.

Referring now to the drawing wherein like reference numerals are used throughout the two views to designate like parts, reference numeral 1 designates therein a shaft which is secured at the vehicle superstructure 3 by means of brackets 2 of any suitable construction. The brake pedal 5 which is under the influence of a return spring 4 is supported on the shaft 1. The brake pedal 5 is operatively connected by way of a piston rod 6 with a piston 8 guided within a master brake cylinder 7. The master brake cylinder 7 is of conventional construction and is secured in any suitable manner at the vehicle superstructure 3. A line 9 leads from the cylinder space 7' to the brake jaws or cheeks 10 of the disk brakes 11 coordinated to the individual wheels. The piston rod 6 consists of a plunger 12 supported in the master brake cylinder 7 and of a sleeve 14 pivotally connected with the brake pedal 5 by the interposition of a bolt 13. The plunger 12 extends through the bore 15 of the sleeve 14 and is provided on the side 16 opposite the piston with a pin 17 (FIG. 2) which serves for the support of a spring 18. The spring 18 is supported on the one hand, at a disk 19 fastened to the pin 17, and on the other, at the end 20 of the sleeve 14 facing the brake pedal 5.

The plunger 12 and the sleeve 14 are provided with flanges 21 and 21' on which are supported two knee-joints generally designated by reference numeral 22. The knee joints 22 essentially consist of two mutually coordinated U-shaped jointed rods 23 and 23' each. The jointed rods 23 and 23' are pivotally connected at the one end 24 and 24' thereof by means of bearing bolts 25 at the respective flanges 21 and 21' of the plunger 12 and of the sleeve 14. At the other end 26 thereof, the jointed rods 23 and 23' are pivotally connected with each other by pins 27. Rollers 28 are supported on pins 27 which roll off along the curved cam tracks 29 during actuation of the brake. The curved cam tracks 29 are constituted by sleeve 30 and are composed of several partial sections A, B, and C. The sleeve 30 is rigidly connected with a bracket or support 31. The support 31 is mounted, for example, at the dash board or fire wall 32 of the vehicle body and is elastically secured thereto by means of screws 33 with the interposition of springs 34.

Operation

The operation of the brake actuating mechanism in accordance with the present invention is as follows:

In the starting position of the brake pedal 5, the rollers 28 of the knee-joint-like rods 22 abut by means of spring 18 at the section A of the curved cam tracks. If the brake pedal 5 is now displaced during braking, then the brake pedal 5 exerts a pressure by way of the sleeve 14 and the jointed rods 23 on rollers 28. The rollers 28 move under this load along the section B of the curved cam track directed toward the sleeve center axis. This results in a displacement of the plunger 12 out of the sleeve 14 and therewith in an increase of the stroke of the piston 8 in the master brake cylinder 7. As a result thereof, with smallest pedal path there is achieved an action by means of which is overcome the venting play (not shown) between the friction linings of the brake jaws and the brake disks 11. With a further depressing of the brake pedal 5, the rollers 28 roll off along the constant section C of the cam track so that no change in length of the piston rod 6 occurs any longer.

Upon releasing the brake pedal 5, the return spring 4 presses the brake pedal 5 and the sleeve 14 pivotally connected therewith back into the starting position. The spring 18 pulls the plunger 12 into the sleeve 14 and thus brings about that the rollers 28 cannot lift off from the curved tracks 29.

While I have shown and described one embodiment in accordance with the present invention, it is understood that the same is not limited thereto but is susceptible of numerous changes and modifications as known to a person skilled in the art without departing from the spirit and scope of the present invention. Thus, with a change of the inclination of the section B of the curved track the stroke increase of the master brake cylinder piston may extend over a smaller or larger path of the pedal. The stroke increase itself can be suitably selected by changing the height difference of the curved track sections A and C, i.e., by suitably selecting the diameters of sections A and C thereof.

Thus, it is obvious that the present invention is not limited to the details shown and described herein but is susceptible of numerous changes and modifications, and I therefore do not wish to be limited to those details but intend to cover all such changes and modifications as are encompassed by the scope of the appended claims.

I claim:

1. An actuating mechanism with variable transmission ratio for hydraulically actuated disk brakes of vehicles in which the friction linings are held with respect to the brake disks with a venting play, comprising:
   a brake actuating member,
   master brake cylinder means including piston means,
   and connecting means operatively connecting said actuating member with said master brake cylinder means including knee-joint-like lever means, cam track means, and means guiding said lever means at said cam track means in such a manner as to effect at least over a part of the actuating path of the actuating member an increase in the piston stroke of the master brake cylinder means,
   said knee-joint-like lever means each including two mutually coordinated joint-rods, said piston means including a two-partite piston rod, means pivotally connecting one end of said joint-rods at one part of said two-partite piston rod, and further means pivotally connecting with each other the other end of said joint-rods.

2. An actuating mechanism with variable transmission ratio for hydraulically actuated disk brakes of vehicles having a fixed part, in which the friction linings are held with respect to the brake disks with a venting play, comprising:
   a brake actuating member,
   master brake cylinder means including piston means,
   and connecting means operatively connecting said actuating member with said master brake cylinder means including knee-joint-like lever means, cam track means, and means guiding said lever means at said cam track means in such a manner as to effect at least over a part of the actuating path of the actuating member an increase in the piston stroke of the master brake cylinder means,
   said cam track means being constituted by sleeve means at least partly surrounding said lever means, said sleeve means being secured at said fixed part of the vehicle.

3. An actuating mechanism with variable transmission ratio for hydraulically actuated disk brakes of vehicles having a fixed part, in which the friction linings are held with respect to the brake disks with a venting play, comprising:
   a brake actuating member,
   master brake cylinder means including piston means,
   and connecting means operatively connecting said actuating member with said master brake cylinder means including knee-joint-like lever means, cam track means, and means guiding said lever means at said cam track means in such a manner as to effect at least over a part of the actuating path of the actuating member an increase in the piston stroke of the master brake cylinder means,
   said cam track means being constituted by sleeve means at least partly surrounding said lever means, said sleeve means being secured at said fixed part of the vehicle,
   and means elastically securing said sleeve means at said fixed part of the vehicle.

4. An actuating mechanism with variable transmission ratio for hydraulically actuated disk brakes of vehicles in which the friction linings are held with respect to the brake disks with a venting play, comprising:
   a brake actuating member,
   master brake cylinder means including piston means,
   and connecting means operatively connecting said actuating member with said master brake cylinder means including knee-joint-like lever means, cam track means, and means guiding said lever means at said cam track means in such a manner as to effect at least over a part of the actuating path of the actuating member an increase in the piston stroke of the master brake cylinder means,
   said knee-joint-like lever means each including two mutually coordinated essentially U-shaped joint-rods, said piston means including a two partite piston rod, means pivotally connecting one end of said joint-rods at one part of said two-partite piston rod, and further means pivotally connecting with each other the other end of said joint-rods,
   roller means pivotally connected at the connecting joints of the lever means, said roller means rolling off along said cam track means during actuation of the brake.

5. An actuating mechanism with variable transmission ratio for hydraulically actuated disk brakes of vehicles, having a fixed part in which the friction linings are held with respect to the brake disks with a venting play, comprising:

a brake actuating member, master brake cylinder means including piston means, and connecting means operatively connecting said actuating member with said master brake cylinder means including knee-joint-like lever means, cam track means, and means guiding said lever means at said cam track means in such a manner as to effect at least over a part of the actuating path of the actuating member an increase in the piston stroke of the master brake cylinder means, said knee-joint-like lever means each including two mutually coordinated essentially U-shaped joint-rods, said piston means including a two partite piston rod, means pivotally connecting one end of said joint-rods at one part of said two-partite piston rod, and further means pivotally connecting with each other the other end of said joint-rods, roller means pivotally connected at the connecting joints of the lever means, said roller means rolling off along said cam track means during actuation of the brake, said cam track means being constituted by sleeve means at least partly surrounding said lever means, and means elastically securing said sleeve means at said fixed part of the vehicle.

References Cited by the Examiner

UNITED STATES PATENTS

| | | | |
|---|---|---|---|
| 1,430,746 | 10/22 | Loughead | 60—54.6 |
| 2,123,374 | 7/38 | McGauchie | 74—110 |
| 2,168,719 | 8/39 | Staude | 60—54.6 |
| 2,558,958 | 7/51 | Jandus et al. | 74—520 X |
| 2,741,896 | 4/56 | Geiger | 60—54.6 |
| 2,884,803 | 5/59 | Willis | 74—512 |

JULIUS E. WEST, *Primary Examiner.*

ROBERT R. BUNEVICH, *Examiner.*